United States Patent
Dyer et al.

(10) Patent No.: US 6,337,684 B1
(45) Date of Patent: Jan. 8, 2002

(54) SURFACE NORMAL COMPRESSION/ DECOMPRESSION STORING TWO VECTOR COMPONENTS

(75) Inventors: Don W. Dyer; Kenneth W. Shrum; Noel D. Scott, all of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/087,005

(22) Filed: May 29, 1998

(51) Int. Cl.[7] .............................................. G06F 15/00
(52) U.S. Cl. ...................................................... 345/419
(58) Field of Search ................................ 345/418, 420, 345/429, 428, 581, 606, 618

(56) References Cited

U.S. PATENT DOCUMENTS 5,793,371 A * 8/1998 Deering ...................... 345/418

FOREIGN PATENT DOCUMENTS

EP 0 757 322 * 5/1997

* cited by examiner

*Primary Examiner*—Phu K. Nguyen

(57) ABSTRACT

A high precision, memory efficient method for the compression of surface normals and the inverse method for the decompression of those compressed surface normals back into surface normals. The normals are first scaled to unit length in Cartesian coordinates. Then, each of the smallest two vector components of the unit length normal is stored along with an indicator of which of the three vector components is not stored plus the algebraic sign of that vector component. Decompression of the surface normal requires first converting the two stored vector components into floating-point values and then using the equation $1 = x^2 + y^2 + z^2$ in order to obtain the non-stored vector component of the unit length normal.

47 Claims, 11 Drawing Sheets

SURFACE NORMAL COMPRESSION/ DECOMPRESSION STORING TWO VECTOR COMPONENTS

FIELD OF THE INVENTION

This invention relates generally to computer graphics and to the rendering of three dimensional images. More particularly, it relates to compression and decompression of surface normal data used in the rendering of three dimensional images.

BACKGROUND

For three dimensional images generated from abstract platonic primitives, such as lines and polygons, computer graphics applications and systems store primitive vertex information such as coordinates of surface points, associated surface normals, and other rendering information such as opacity, color, etc. Surface normals are vectors and as such are defined by a length and a direction. They can be represented in Cartesian coordinates by the coordinates $\{x,y,z\}$ of a parallel vector of the same length whose starting point is the coordinate system origin.

This procedure for storing surface normals as a set of three floating point numbers introduces several problems. First, floating-point number representations of Cartesian coordinates often provide more precision than needed for realistic visual representation resulting in inefficient use of the resources of memory and computation time. Second, storing a surface normal as an $\{x,y,z\}$ Cartesian vector does not guarantee that the surface normal is of unit length, i.e. the distance from the origin to the point $\{x,y,z\}$ is one. Graphics libraries in common use expect to receive surface normal data in unit length and must scale the length of the surface normals to one, if they are not received as such. And third, using common single precision floating point formats, the total space required to store a surface normal is three 32-bit full words, or 12 bytes. When several hundred thousand surface normals need to be stored, along with other geometric and application data, upper bounds on system memory resources can be reached. This inefficient use of memory limits the maximum size and resolution of the image that can be rendered at any given time.

A common technique used to address the above problems is to represent and store surface normals as spherical coordinates instead of Cartesian coordinates. Using this technique two floating point values are specified, one for the longitude or polar angle and one for the latitude or azimuthal angle, which results in a 3:2 data compression ratio for the unit length surface normal. Required memory could be reduced further, with reduced precision, by storing the latitude and longitude as two short integers, each of which requires 2 bytes of memory in common systems, for a total of 4 bytes, resulting in a 3:1 data compression ratio. However, the numeric precision is not uniform between the two coordinate values of longitude and latitude. If the normal position is near latitude $\pi/2$ or $-\pi/2$ (i.e., near the poles), the longitude value provides much greater precision than when the latitude is near 0 (i.e., near the equator). Also, conversion from spherical coordinates to Cartesian coordinates for graphics processing is computationally expensive.

Another technique for storing the unit length surface normals is to use an abstract single number representation. This technique involves a tessellation of a sphere obtained by combining the vertices of two platonic solids, the icosahedron and the dodecahedron. Then, a 4-deep triangle subdivision of the resulting 60 equilateral triangles is performed giving a sphere covered with 7680 triangles. A surface normal is mapped into an abstract value by first determining which of the original 60 triangles contains the normal. Then 128 dot products with the normal to the 128 interior triangles are performed. The largest dot product indicates the best matching triangle for the incoming normal. The result of these computations is used as the compressed normal. To decompress, the compressed normal is used to index a table of pre-computed values. Calculation of the numerous dot products required in this technique is computationally inefficient. Higher resolution, i.e., more and smaller triangles, results in even more involved computations. Much of the memory savings inherent in this technique is lost because of the size of the lookup table. Also, the range of compressed normals is limited by the size of the decompression table which puts an upper limit on their precision. This technique is often used to map normals to pre-computed lighting values using a lookup table as above with the lighting values instead of normals. Used in this manner, when the lighting direction to the model is changed, the values in the look-up table must be recomputed, resulting in additional computation time. Because a lighting look-up table is used, this algorithm does not address the issue of scaling the original surface normal coordinates for unit length, and thus is not a data compression technique in the purest sense.

Still another method uses an abstract single number as an index into a table of surface normals based on the tessellation of a unit sphere. Because of the symmetry of the unit sphere, the table size can be reduced by dividing the unit sphere into identical octants bounded by the x=0, y=0, and z=0 planes. This division results in a triangular shaped area which is further folded into identical sextants bounded by the x=y, y=z, and x=z planes. The resulting table size is reduced by a factor of 48.

In a further refinement of the previous method, the normal is encoded as two orthogonal angular addresses. This coding technique allows selection of the resolution of the surface normal by increasing or reducing the number of bits in each angular address. Further reduction of normal size is possible by encoding the normal index using a variable length delta-encoding where only the difference between adjacent normals is encoded. This technique can reduce the size of an encoded normal by half.

Such methods result in high compression, but are computationally expensive to compress and decompress. In addition, employing an index into a table consumes a large amount of memory in storing the table and incurs a performance penalty in accessing values from the table. Also, encoding the surface normal as two orthogonal angular addresses introduces data alignment issues which slow memory access and require special code to access and align the data for processing.

Therefore, in order to better meet the dual requirements of reduced memory utilization which permits more geometry to be loaded into memory and of higher speed which increases rendering performance, a need exists for further improvements in compression methods used in storing surface normal data for use in rendering three dimensional images.

SUMMARY OF THE INVENTION

In a representative embodiment of the methods for compression of a surface normal, if not already of unit length, the surface normal is first scaled to unit length in Cartesian coordinates. The vector component of the surface normal having the largest magnitude is identified. Then the two remaining vector components are stored in a predefined order and in a memory space whose combined size is a preselected number of bytes less at least three bits, two bits of which is the number of bits necessary to store an indicator of the vector component not stored and one bit of which indicates the algebraic sign of that vector component. For example, if z is the largest component of the surface normal, {x,y} are stored in that order; if y is the largest component, {x,z} are stored in that order; and if x is the largest component, {y,z} are stored in that order. In a representative embodiment, if the preselected number of bytes is four (32 bits), each of the two stored vector components including the algebraic sign and exponent of that component is stored in 14 bits. At least two of the remaining bits are used to indicate which of the three vector components {x,y,z} is not stored, and an additional bit is used to store the sign of the vector component not stored. Alternatively three bits could be used to indicate which of the three vector components {x,y,z} is not stored, since that bit would otherwise not be used.

Decompression of the surface normal requires first scaling the two stored vector components into floating-point values for the operating system in use. Since the two vector components stored were vector components of a unit length surface normal, the third vector component is obtained from the definition of a three-dimensional unit length, i.e., from the following equation: $1=x^2+y^2+z^2$. As an example if x and y were the vector components that were stored, z is the non-stored vector component and is obtained from $$z=+/-\sqrt{1-x^2-y^2}$$

with the sign of z being determined from the sign bit which was stored as indicated above.

Compressed surface normals obtained using methods of a representative embodiment of the present invention would enable graphics applications to display larger geometry data sets with higher performance than would otherwise be possible without compression. The methods used in the representative embodiments are simple and fast. They can be implemented in graphics hardware with minimal cost and complexity and with full graphics performance. Also, decompressed surface normals are by definition of unit length. Other aspects and advantages of the present invention will become apparent from the following detailed description, taken in conjunction with the accompanying drawings, illustrating by way of example the principles of the invention. The details disclosed in the specification should not be read so as to limit the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements.

DETAILED DESCRIPTION OF THE PREFERRED EMBODIMENTS

1. Introduction

Figure 1:
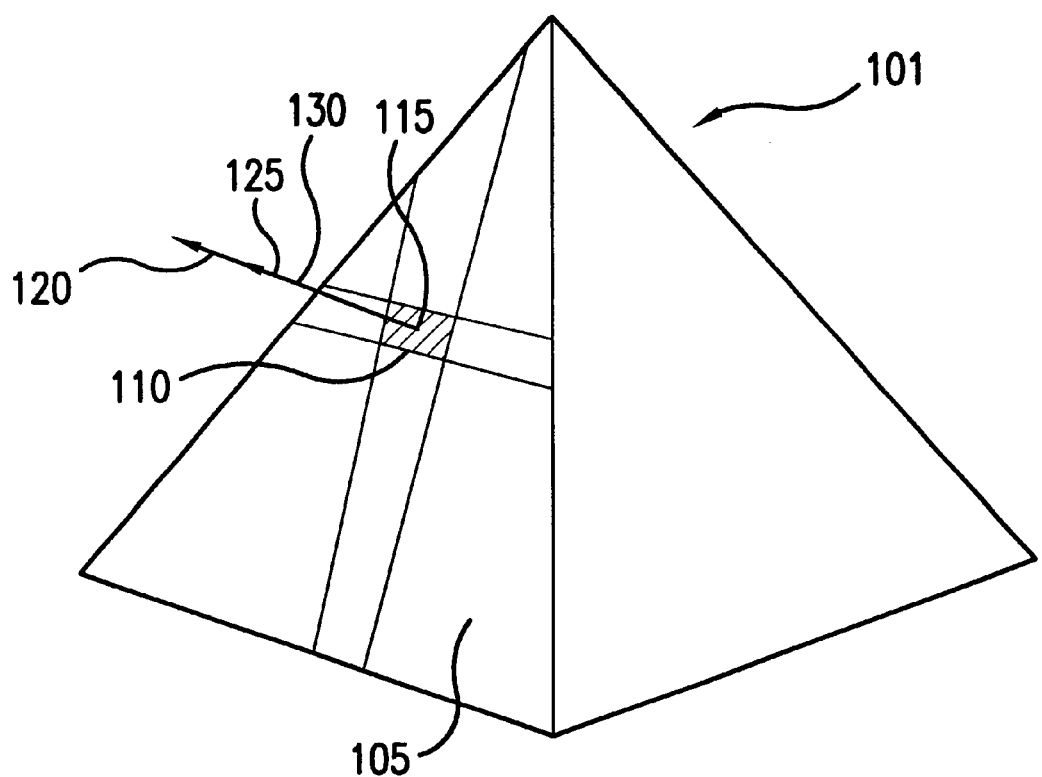
FIG. 1 is a three dimensional drawing of a tetrahedron showing a surface normal associated with a small area.

As shown in the drawings for purposes of illustration, the present invention relates to a novel method of compression and decompression of surface normal data used in the rendering of three dimensional images. As an intermediate step in a representative embodiment, unit length surface normal data is stored in compressed format and then decompressed for use in rendering three dimensional images on the screen of a computer, a printer, or other appropriate device. A representative embodiment of the present invention provides a memory and computational efficient method of compressing and decompressing surface normals of three dimensional images. Decompressed surface normals will be of unit length which is the format expected by most standard graphics libraries. In the following detailed description and in the several figures of the drawings, like elements are identified with like reference numerals.

2. Geometric Descriptions

FIG. 1 is an illustrative drawing of a three dimensional FIG. 101, a tetrahedron in this example, having a surface 105. A small surface area 110 on the surface 105 surrounds a point 115. The point 115 has passing through it, a surface normal 120 which is a vector that has direction perpendicular to the surface 105 at the point 115 and which is described by three floating point numbers {x,y,z} representing vector components of the surface normal 120. The surface normal 120 at the point 115 is assumed to represent the surface normal 120 for all points lying within the small surface area 110. Although only one small surface area 110 is shown in FIG. 1, the surface 105 is conceptually divided into many small surface areas 110 of approximately equal areas. A unit length surface normal 125 is shown which is the vector resulting from scaling the surface normal 120 to unit length. Also shown in FIG. 1 is a decompressed unit length surface normal 130 which is obtained by decompressing the compression of the unit length surface normal 125. The decompressed unit length surface normal 130 and the unit length surface normal 125 are shown superimposed in FIG. 1. However, in practice there may be some difference between the decompressed unit length surface normal 130 and the unit length surface normal 125 due to a loss of precision in the compression/decompression processes.

One complete tetrahedral face of the three dimensional FIG. 101 could have been represented by the single surface normal 120 and its associated single unit length surface normal 125. However, for purposes of illustration this relatively simple figure is conceptually broken up into a number of small surface areas 110 as a more complicated surface, such as a curved surface, would be.

Figure 2:
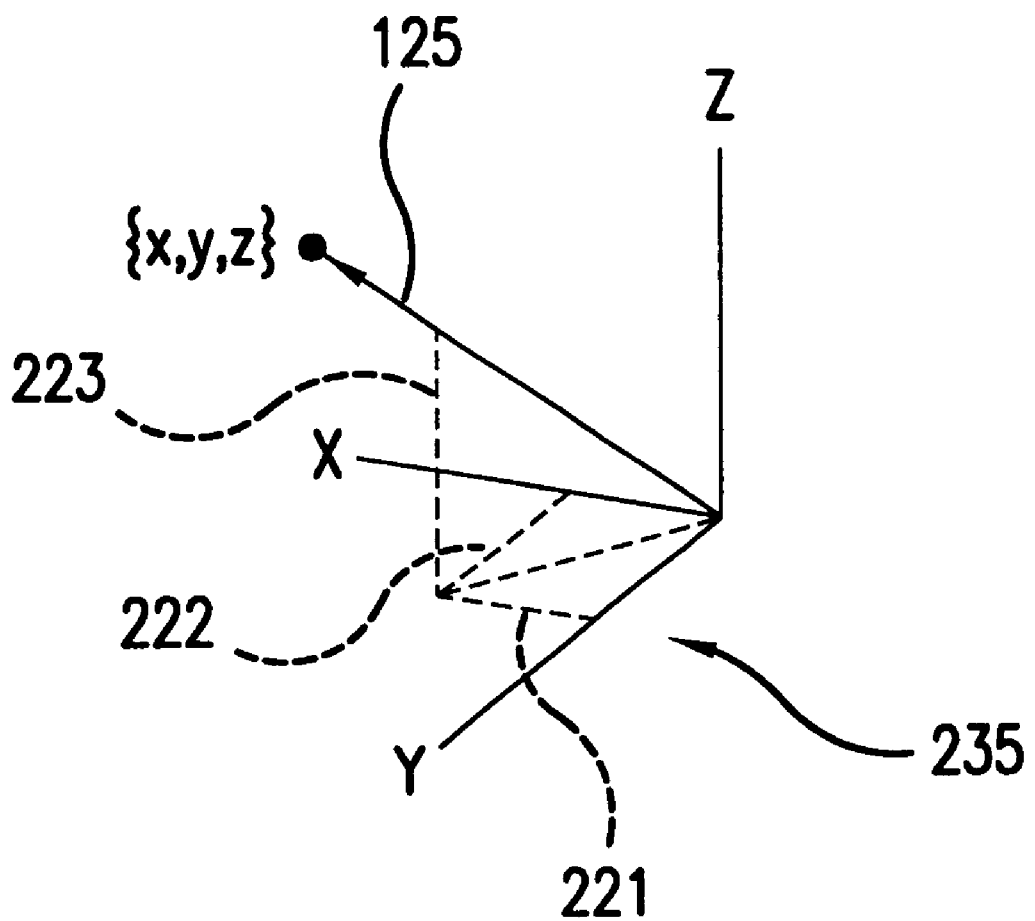
FIG. 2 is a representative drawing of a surface normal in a Cartesian coordinate system.

FIG. 2 is a drawing of a Cartesian coordinate system 235. If the surface normal 120 is represented by any set of coordinates other than those of a Cartesian coordinate system 235, this representation is first transformed into Cartesian coordinates wherein the surface normal 120 is represented by three floating point coordinates {x,y,z} of the Cartesian coordinate system 235. Note that the location and orientation of the Cartesian coordinate system 235 is completely arbitrary, and the Cartesian coordinate system 235 shown in FIG. 2 is shown for illustrative purposes only. The Cartesian coordinate system 235 representation of the surface normal 120 then is scaled to unit length to form the unit length surface normal 125 which is a vector of unit length having direction perpendicular to the surface 105 at the point 115, i.e., parallel to the surface normal 120. The unit length surface normal 125 is then compressed in accordance with the methods to be further described below.

The unit length surface normal 125 has three vector components; a first vector component 221, a second vector component 222, and a third vector component 223. In the example of FIG. 2, the first vector component 221 is shown directed along the X-axis of the Cartesian coordinate system 235, the second vector component 222 is shown directed along the Y-axis, and the third vector component 223 is shown directed along the Z-axis. However, the particular axes of the Cartesian coordinate system 235 along which the first vector component 221, the second vector component 222, and the third vector component 223 are directed can be arbitrarily specified by the user. In a representative embodiment, the compressed form of the surface normal 120 is stored in computer memory by storing the values of the first vector component 221 and the second vector component 222. Defining the surface normal to always point in a given octant of three dimensional space, the algebraic signs of the first vector component 221 and the second vector component 222 may or may not be stored. The decompressed form of the unit length surface normal 125 can be recovered by using the formula $$z=\sqrt{1-x^2-y^2}$$ (EQ. 1)

to obtain the third vector component 223.

Another embodiment stores the unit length surface normal 125, by storing the first vector component 221 wherein the first vector component 221 is smallest of the three vector components of the unit length surface normal 125 and by storing the second vector component 222 wherein the second vector component 222 is next smallest of the three vector components of the unit length surface normal 125. In the event that one or more of the vector component magnitudes are equal, the user may arbitrarily choose which of the smaller components to store. In this representative embodiment, it is necessary to store a specification as to which axis of the Cartesian coordinate system 235 the third vector component 223, also referred to herein as the non-stored vector component 223, is parallel to. Once again, it is possible to specify that the unit length surface normal 125 always points in the direction of a specified octant, or in another embodiment the direction of the unit length surface normal 125 can be specified by specifying the octant in which it does point, and in yet another embodiment the direction of the unit length surface normal 125 may be specified by storing the algebraic signs of the three vector components which form it.

3. Compression Using Ordered Pair of Surface Normal Vector Components

Figure 3:
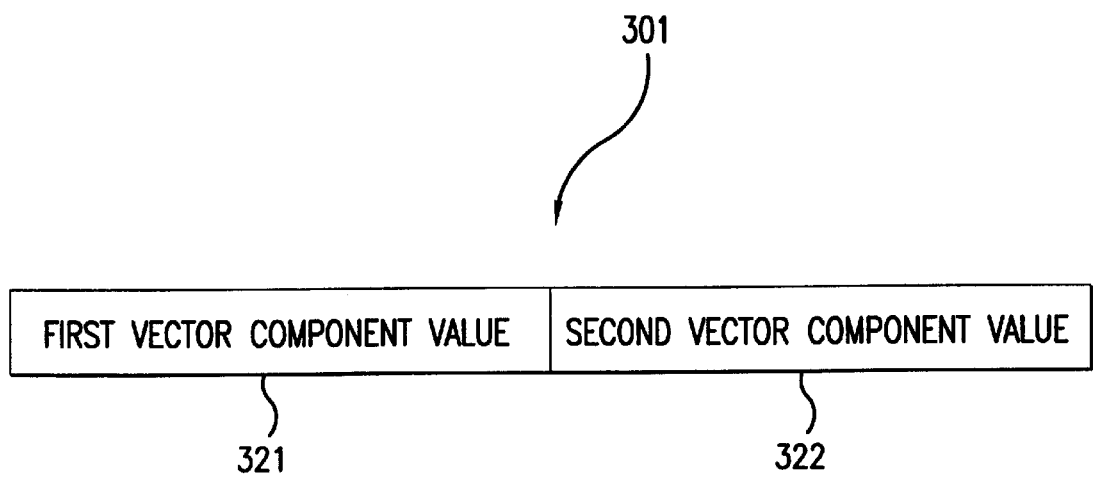
FIG. 3 is a schematic drawing of a segment of computer memory used in a preferred embodiment of the invention.

FIG. 3 is a schematic drawing of a first computer memory segment 301 which in a first representative embodiment is used to store a value of the first vector component 221 as a first vector component value 321 and a value of the second vector component 222 as a second vector component value 322. The octant in which the unit length surface normal 125 points must be pre-specified in this embodiment.

Figure 4:
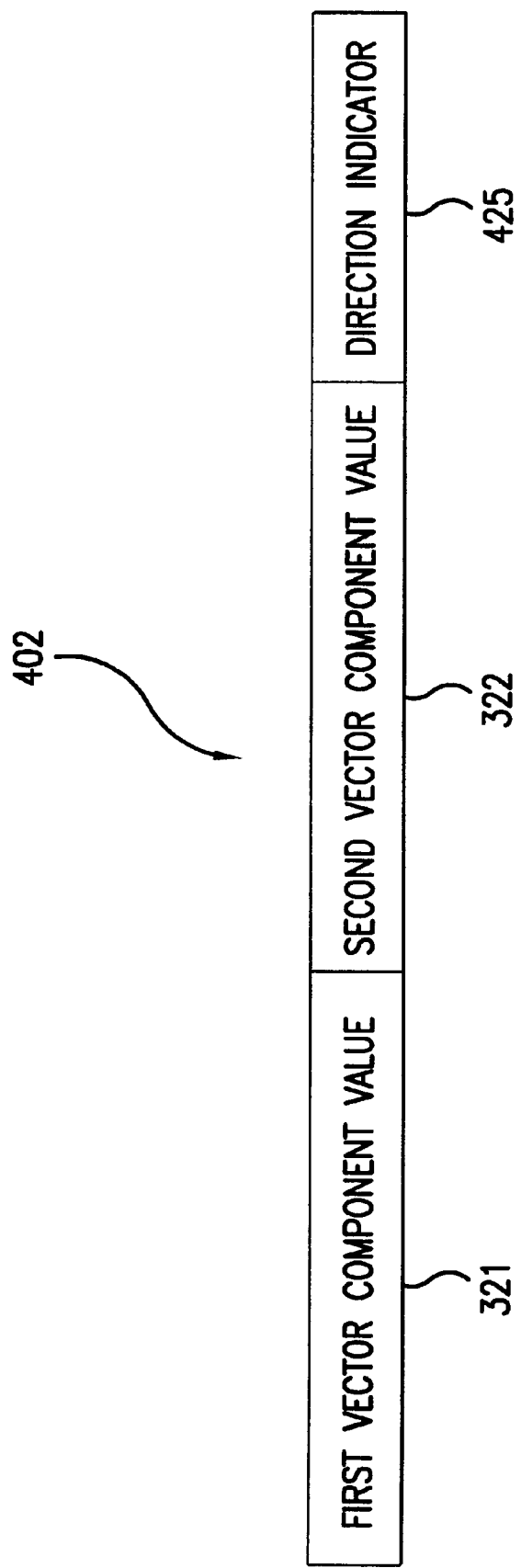
FIG. 4 is a schematic drawing of a segment of computer memory used in an alternate preferred embodiment of the invention.

FIG. 4 is a schematic drawing of a second computer memory segment 402 which is used in a second representative embodiment and a third representative embodiment to store the value of the first vector component 221 as the first vector component value 321 and the value of the second vector component 222 as a second vector component value 322. Also stored is a direction indicator 425 which specifies the direction in which the unit length surface normal 125 points. In the second representative embodiment, the direction indicator 425 specifies the octant of the Cartesian coordinate system 235 in which the unit length surface normal 125 points, and in the third representative embodiment, the direction indicator 425 specifies the algebraic sign of the third vector component 223. In the latter case, the algebraic sign of the first vector component 221 is stored with that value, and the algebraic sign of the second vector component 222 is stored with that value.

Figure 5:
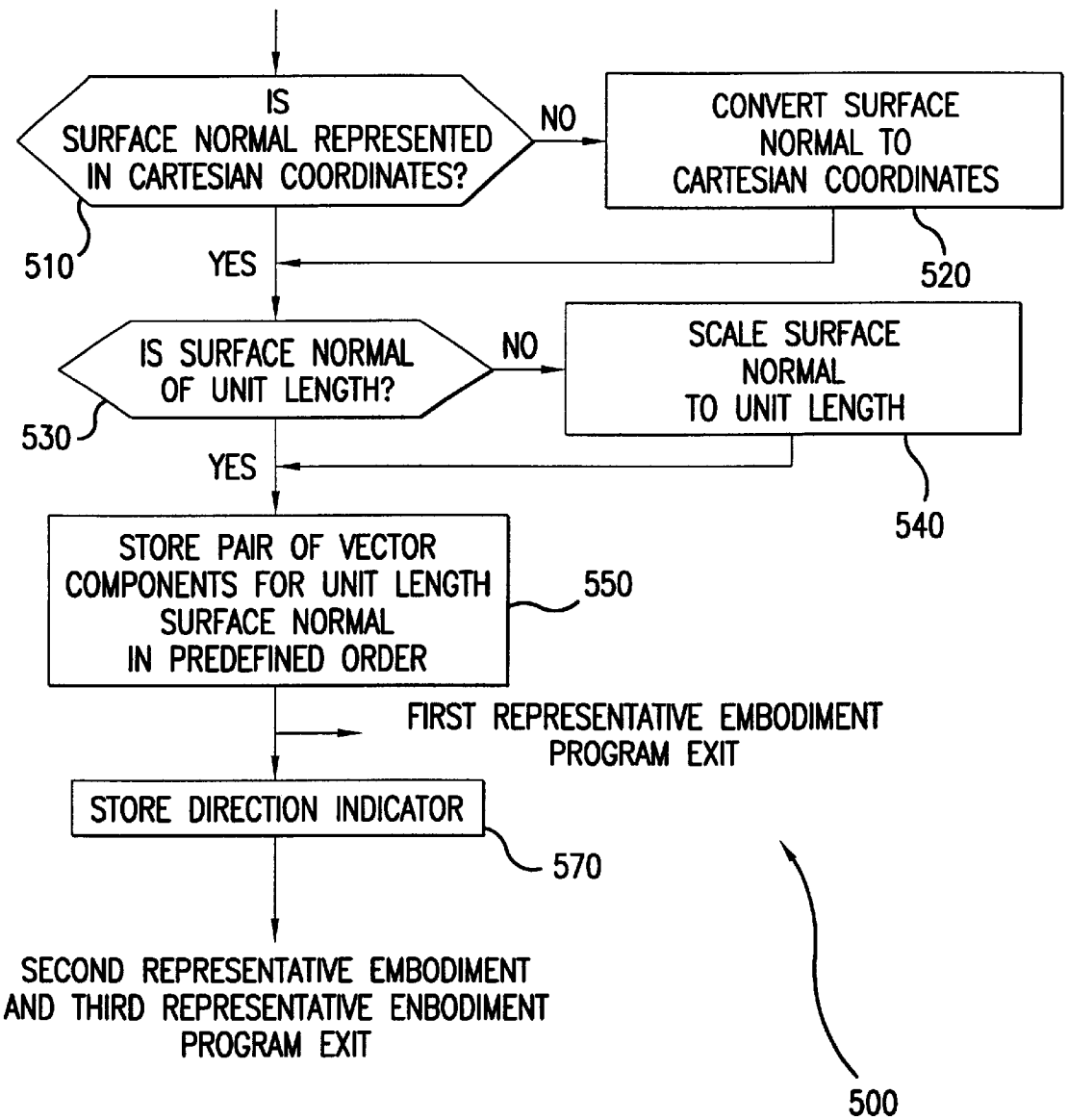
FIG. 5 is a flow chart of a computer program for compressing a surface normal according to a preferred embodiment of the invention.

FIG. 5 is a flowchart of a surface normal data compression computer program 500 that compresses or maps the surface normal 120 into a compressed representation. The compression techniques discussed in relationship to FIG. 5 use the data structures shown in FIG. 3 and in FIG. 4.

Block 510 is the entry block into the surface normal data compression computer program 500 and determines whether or not the surface normal 120 is represented in Cartesian coordinates. When the surface normal 120 is represented in Cartesian coordinates, block 510 transfers control to block 530. Otherwise, block 510 transfers control to block 520.

Block 520 converts the surface normal 120 to Cartesian coordinates. Control then is transferred to block 530.

When the surface normal 120 is scaled to unit length, block 530 transfers control to block 550. Otherwise, block 530 transfers control to block 540.

Block 540 scales the surface normal 120 to unit length. Block 540 then transfers control to block 550.

In the first representative embodiment, the octant in which the surface normal 120 points is assumed known and constant. In this embodiment, block 550 stores the first vector component value 321 of the first vector component 221 and the second vector component value 322 of the second vector component 222 in the first computer memory segment 301 shown in FIG. 3. The first vector component 221 and the second vector component 222 are a preselected, ordered pair of Cartesian coordinate system 235 vector components of the unit length surface normal 125, which could be for example the {x,y} vector components. In the first representative embodiment, block 550 is the termination point of the surface normal data compression program 500.

In the second representative embodiment and in the third representative embodiment, the octant in which the surface normal 120 points is assumed unknown. In these embodiments, block 550 stores the first vector component value 321 of the first vector component 221 and the second vector component value 322 of the second vector component 222 in a second computer memory segment 402 shown in FIG. 4. The first vector component 221 and the second vector component 222 are a preselected, ordered pair of Cartesian coordinate system 235 vector components of the unit length surface normal 125, which could be for example the {x,y} vector components. In the second representative embodiment and the third representative embodiment, block 550 then transfers control to block 570.

Block 570 stores a direction indicator 425 in the second computer memory segment 402. In the second representative embodiment, the direction indicator 425 defines the algebraic sign of the non-stored vector component 223 of the unit length surface normal 125. The indication of the algebraic sign is stored in a minimum of one bit. In the third representative embodiment, the direction indicator 425 specifies the octant that the unit length surface normal 125 points. The indication of the octant is stored in a minimum of three bits. In both the second representative embodiment and the third representative embodiment, bock 570 is the termination point of the surface normal data compression program 500.

4. Compression Using Smaller Two Vector Components of Surface Normal

Figure 6:
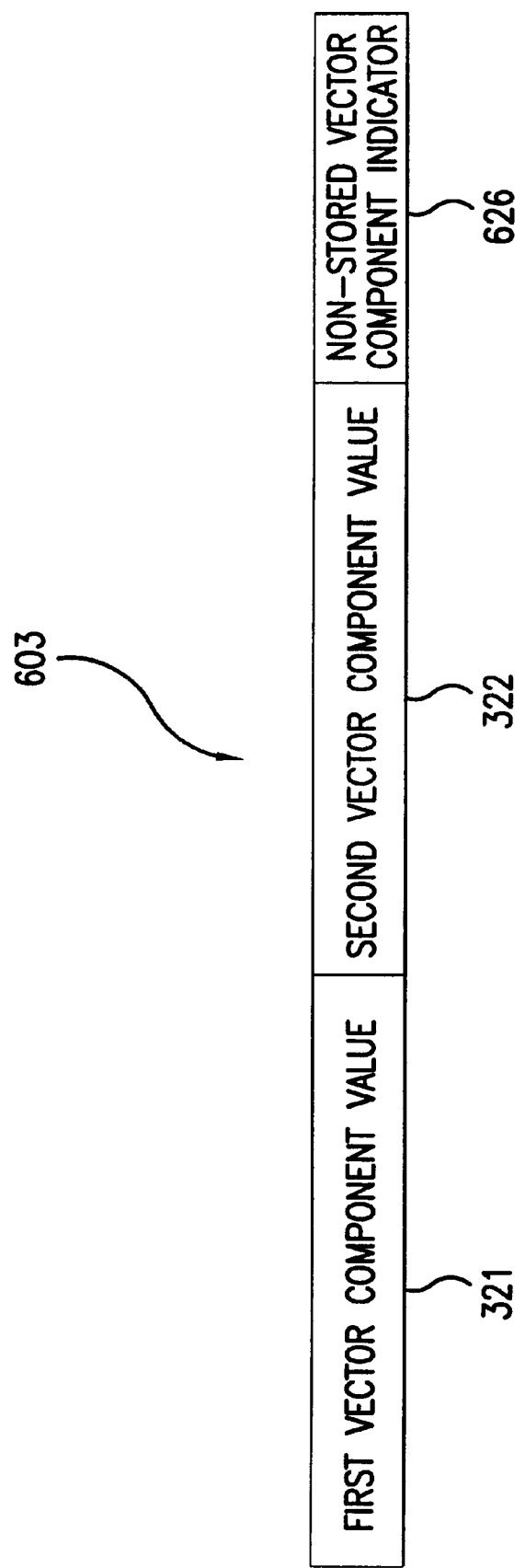
FIG. 6 is a schematic drawing of a segment of computer memory used in an alternate preferred embodiment of the invention.

FIG. 6 is a schematic drawing of a third computer memory segment 603 which is used in a fourth representative embodiment to store the value of the first vector component 221 as the first vector component value 321 and the value of the second vector component 222 as the second vector component value 322, wherein the first vector component 221 and the second vector component 222 are the ordered pair of the two smallest vector components of the unit length surface normal 125. Also stored is a non-stored vector component indicator 626 which specifies the component of the unit length surface normal 125 which is not stored. The octant in which the unit length surface normal 125 points must be pre-specified in this embodiment.

Figure 7:
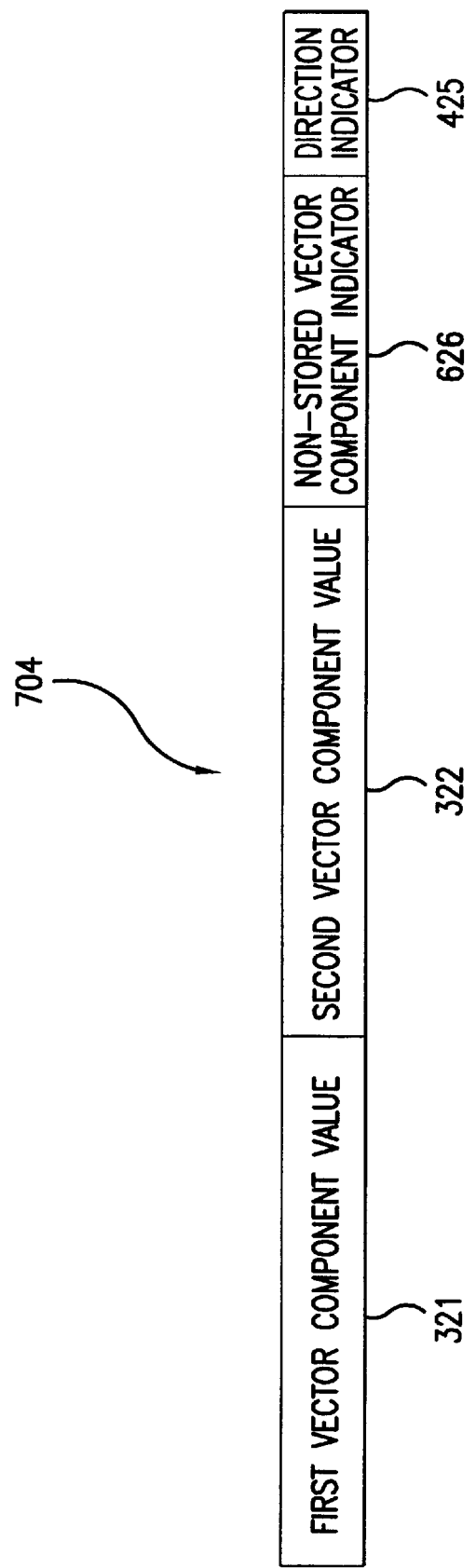
FIG. 7 is a schematic drawing of a segment of computer memory used in an alternate preferred embodiment of the invention.

FIG. 7 is a schematic drawing of a fourth computer memory segment 704 which is used in a fifth representative embodiment to store the value of the first vector component 221 as the first vector component value 321 and the value of the second vector component 222 as the second vector component value 322, wherein the first vector component 221 and the second vector component 222 are the ordered pair of the two smallest vector components of the unit length surface normal 125. Also stored is a non-stored vector component indicator 626 which specifies the component of the unit length surface normal 125 which is not stored and a direction indicator 425 which in the fifth representative embodiment specifies the algebraic sign of the non-stored vector component 223 and in the sixth representative embodiment specifies the octant in which the unit length surface normal 125 points. In the former case, the algebraic sign of the first vector component 221 is stored with the first vector component value 321, and the algebraic sign of the second vector component 222 is stored with the second vector component value 322.

Figure 8:
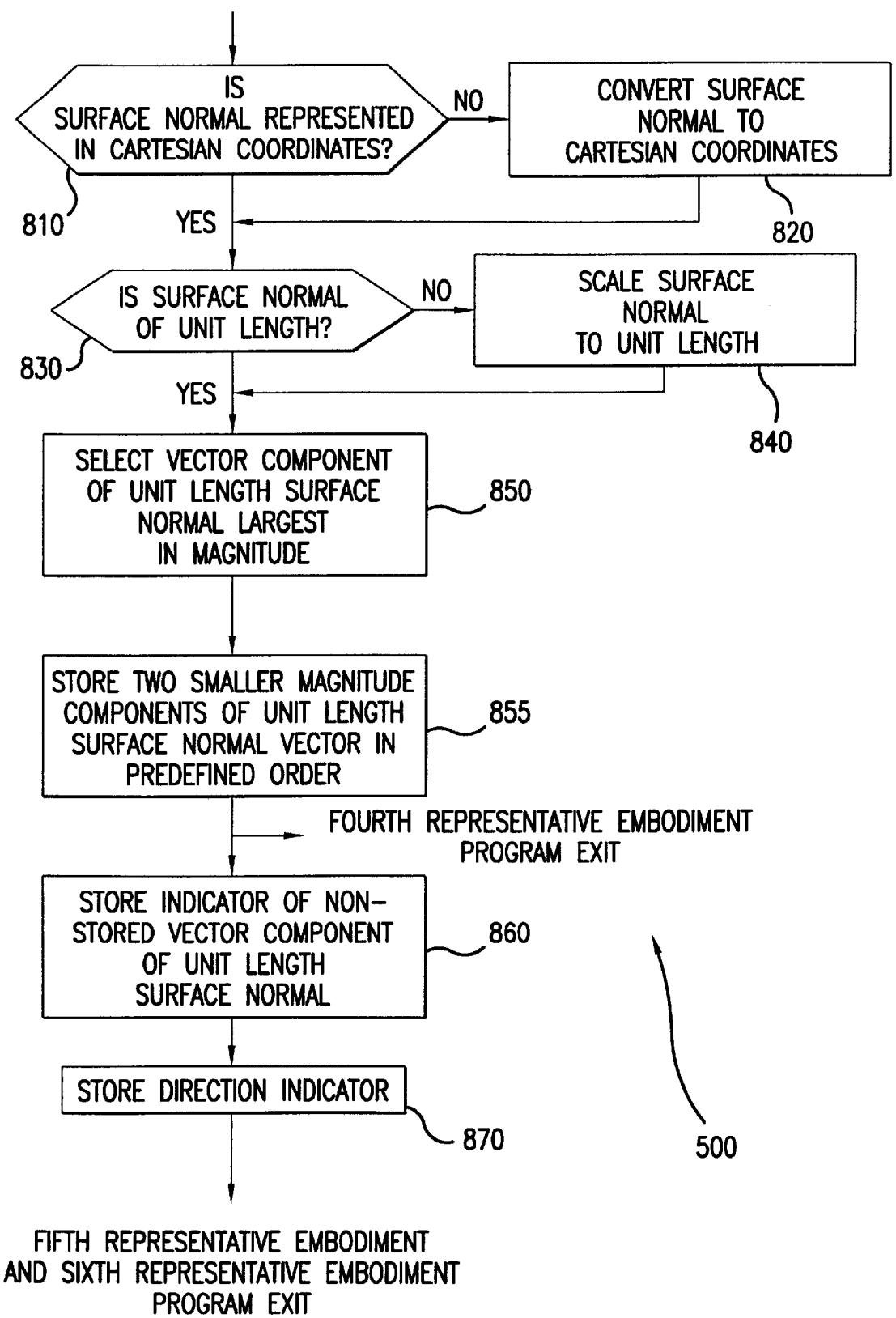
FIG. 8 is a flow chart of a computer program for compressing a surface normal according to an alternate preferred embodiment of the invention.

FIG. 8 is a flowchart of another embodiment of the surface normal data compression computer program 500 that compresses or maps the surface normal 120 into a compressed representation of the surface normal 120. The compression techniques discussed in relationship to FIG. 8 uses the data structures shown in FIG. 6 and in FIG. 7.

Block 810 is the entry block into the surface normal data compression computer program 500 and determines whether or not the surface normal 120 is represented in Cartesian coordinates. When the surface normal 120 is represented in Cartesian coordinates, block 810 transfers control to block 830. Otherwise, block 810 transfers control to block 820.

Block 820 converts the surface normal 120 to Cartesian coordinates. Control then is transferred to block 830.

When the surface normal 120 is scaled to unit length, block 830 transfers control to block 850. Otherwise, block 830 transfers control to block 840.

Block 840 scales the surface normal 120 to unit length. Block 840 then transfers control to block 850.

Block 850 identifies which component of the unit length surface normal 125 is the largest in magnitude. This largest vector component is the non-stored vector component 223. Block 850 then transfers control to block 855.

Block 855 stores the value of the first vector component 221 in the first vector component value 321 and the value of the second vector component 222 in the second vector component value 322, wherein the first vector component 221 and the second vector component 222 are the ordered pair of the two smaller vector components of the unit length surface normal 125, either in the third computer memory segment 603 shown in FIG. 6 in the fourth representative embodiment or in the fourth computer memory segment 704 shown in FIG. 7 in the fifth representative embodiment and the sixth representative embodiment. Block 855 then transfers control to block 860.

In the fourth representative embodiment, block 860 stores a non-stored vector component indicator 626 in the third computer memory segment 603 shown in FIG. 6, and then exits the surface normal data compression computer program 500.

In the fifth representative embodiment and the sixth representative embodiment, block 860 stores a non-stored vector component indicator 626 in the fourth computer memory segment 704 shown in FIG. 7, and then transfers control to bock 870.

Block 870 stores, in the fourth computer memory segment 704, a direction indicator 425. In the fifth representative embodiment, the direction indicator 425 defines the algebraic sign of the non-stored vector component 223 of the unit length surface normal 125 and is stored in a minimum of one bit. In the sixth representative embodiment, the direction indicator 425 specifies the octant that the unit length surface normal 125 points and is stored in a minimum of three bits. Bock 870 then exits the computer program for the fifth representative embodiment and the sixth representative embodiment.

5. Decompression Using Ordered Pair of Surface Normal Vector Components

Figure 9:
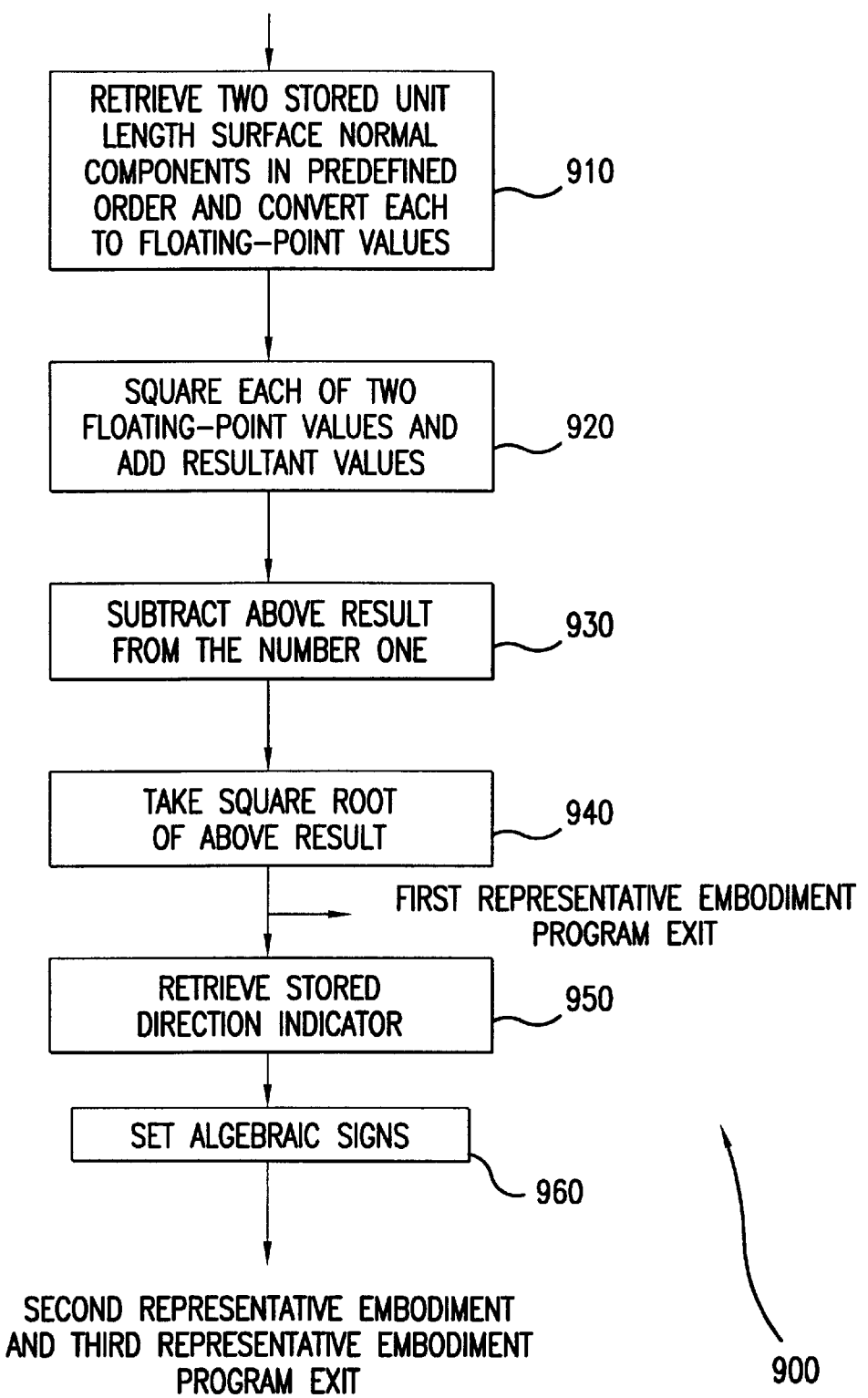
FIG. 9 is a flow chart of a computer program for decompressing a compressed surface normal according to a preferred embodiment of the invention.

FIG. 9 is a flowchart of various representative embodiments of the surface normal data decompression computer program 900 that decompresses or maps the compressed representations of the unit length surface normal 125 into the decompressed unit length surface normal 130. The decompression techniques discussed in relationship to FIG. 9 use the data structures shown in FIG. 3 and in FIG. 4.

Block 910 is the entry point into the surface normal data decompression computer program 900.

In the first representative embodiment, block 910 retrieves compressed representations of the first vector component 221 and the second vector component 222 of the unit length surface normal 125 from the first computer memory segment 301. In the second representative embodiment and the third representative embodiment, block 910 retrieves compressed representations of the first vector component 221 and the second vector component 222 of the unit length surface normal 125 from the second computer memory segment 402. Block 910 converts these representations into floating-point values and then transfers control to block 920.

Block 920 squares each of the two stored vector components of the unit length surface normal 125 and adds the resultant values. Block 920 then transfers control to block 930.

Block 930 subtracts the resultant sum of block 920 from the number one. Block 930 then transfers control to block 940.

Block 940 takes the square root of the resultant subtraction of block 930. In the first representative embodiment, the octant in which the surface normal 120 and therefore the decompressed unit length surface normal 130 points is pre-specified. As such, the algebraic sign for the decompressed unit length surface normal 130 is also pre-specified. In the first representative embodiment, block 940 exits the computer program. In the second representative embodiment and the third representative embodiment, block 940 transfers control to block 950.

Block 950 retrieves the value of the direction indicator 425 from the second computer memory segment 402. In the second representative embodiment, the value of the direction indicator 425 defines the algebraic sign of the non-stored vector component 223 of the unit length surface normal 125. The indication of the algebraic sign stored in the direction indicator 425 occupies a minimum of one bit. In the third representative embodiment, the direction indicator 425 specifies the octant that the unit length surface normal 125 points. The indication of the octant stored in the direction indicator 425 occupies a minimum of three bits. Bock 950 then transfers control to block 960.

In the second representative embodiment, block 960 identifies the algebraic sign of the third vector component 223. In the third representative embodiment, block 960 identifies the algebraic signs for the first vector component 221, the second vector component 222, and the third vector component 223 as determined by the octant in which the unit length surface normal 125 points which is specified by the direction indicator 425. Block 960 then exits the computer program for the second representative embodiment and the third representative embodiment.

6. Decompression Using Smaller Two Vector Components of Surface Normal

Figure 10:
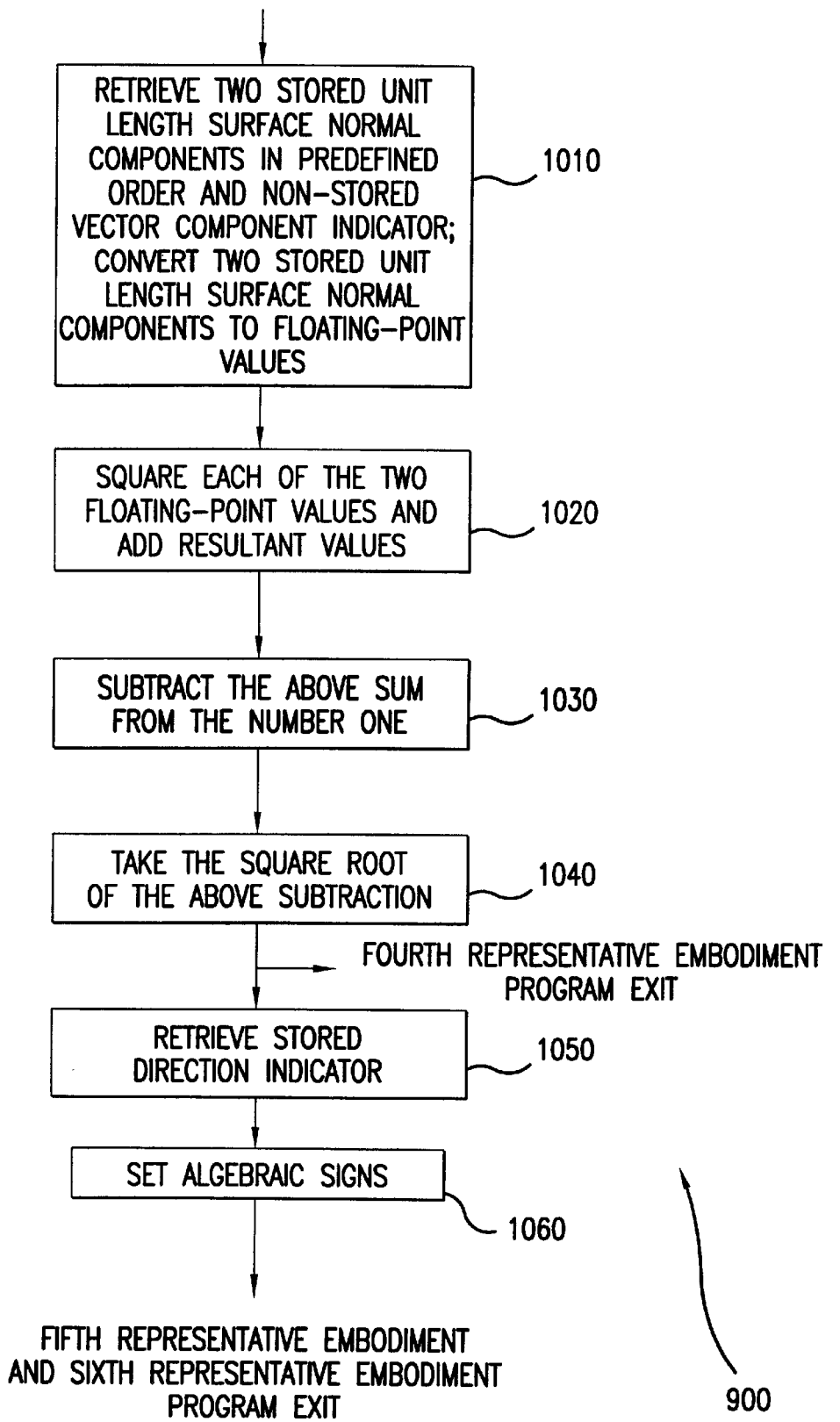
FIG. 10 is a flow chart of a computer program for decompressing a compressed surface normal according to an alternate preferred embodiment of the invention.

FIG. 10 is a flowchart of other representative embodiments of the surface normal data decompression computer program 900 that decompresses or maps the compressed representations of the unit length surface normal 125 into the decompressed unit length surface normal 130. The compression techniques discussed in relationship to FIG. 10 use the data structures shown in FIG. 6 and in FIG. 7.

Block 1010 is the entry point into the surface normal data decompression computer program 900.

In the fourth representative embodiment, block 1010 retrieves compressed representations of the value of the first vector component 221 and the value of the second vector component 222, wherein the first vector component 221 and the second vector component 222 are the smaller two vector components of the unit length surface normal 125, and the non-stored vector component indicator 626 from the third computer memory segment 603. In the fifth representative embodiment, block 1010 retrieves compressed representations of the value of the first vector component 221 and the value of the second vector component 222, wherein the first vector component 221 and the second vector component 222 are the smaller two vector components of the unit length surface normal 125, and the non-stored vector component indicator 626 from the fourth computer memory segment 704. Block 1010 converts these representations into floating-point values and then transfers control to block 1020.

Block 1020 squares the value of the first vector component 221, squares the value of the second vector component 222, and then adds the resultant values. Block 1020 transfers control to block 1030.

Block 1030 subtracts the resultant sum of block 1020 from the number one. Block 1030 then transfers control to block 1040.

Block 1040 takes the square root of the resultant subtraction of block 1030. In the fourth representative embodiment, block 1040 then exits the surface normal data decompression computer program 900. In the second representative embodiment of block 1010, block 1040 then transfers control to block 1050.

Block 1050 retrieves the direction indicator 425 from the fourth computer memory segment 704. In the fifth representative embodiment, the direction indicator 425 defines the algebraic sign of the non-stored vector component 223 of the unit length surface normal 125 and is stored in a minimum of one bit. In the sixth representative embodiment, the direction indicator 425 specifies the octant that the unit length surface normal 125 points and is stored in a minimum of three bits. Bock 1050 then transfers control to block 1060.

In the fifth representative embodiment, block 1060 sets the algebraic signs for the non-stored vector component 223 as specified by value of the direction indicator 425. In the sixth representative embodiment, block 1060 sets the algebraic signs for the first vector component 221, the second vector component 222, and the non-stored vector component 223 as determined by the octant in which the unit length surface normal 125 points which is specified by the direction indicator 425. Block 1060 is the termination point of the surface normal data decompression computer program 900 for the fifth representative embodiment and the sixth representative embodiment.

7. Computer System for Compression/Decompression of Surface Normals

Figure 11:
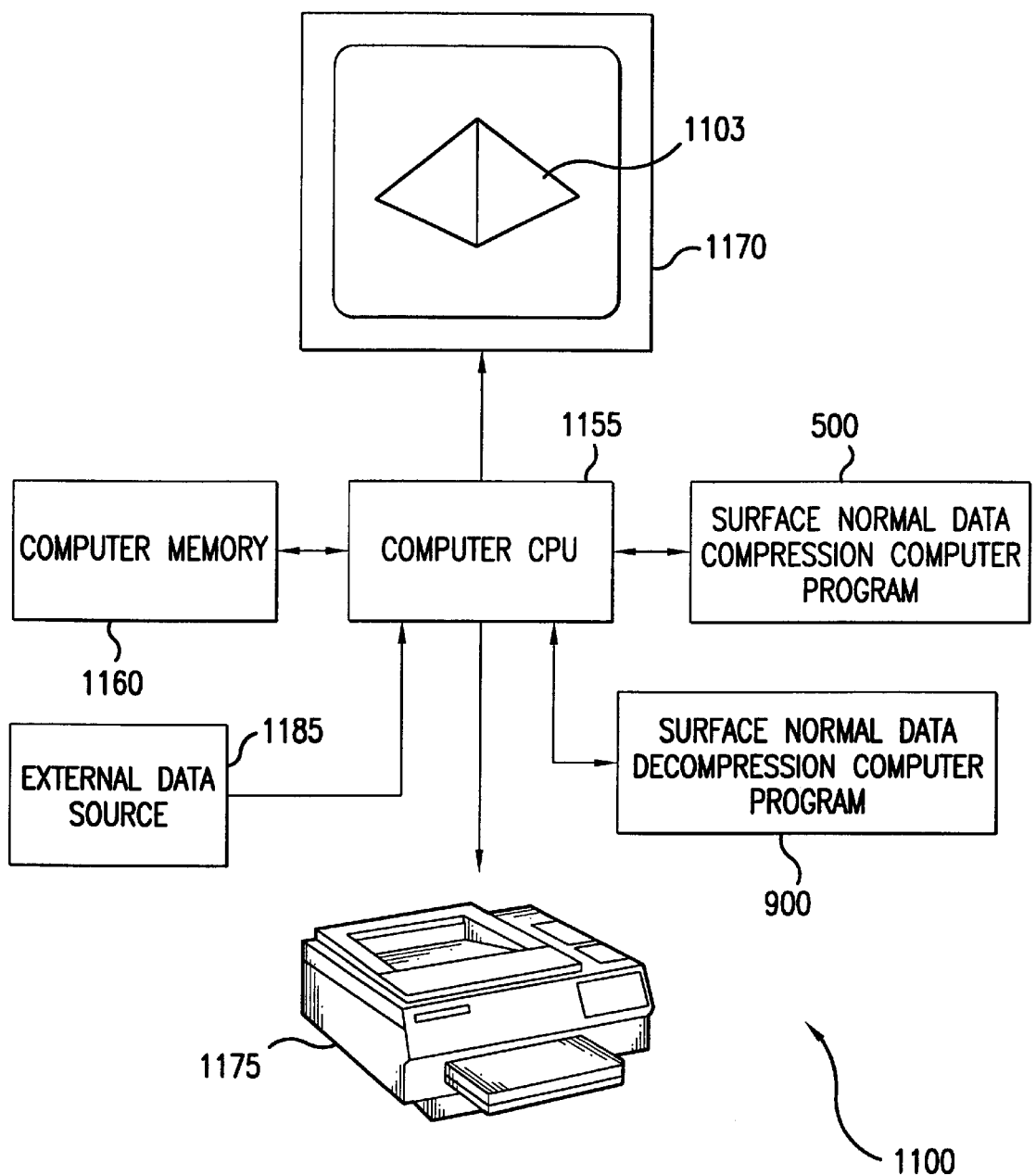
FIG. 11 is a drawing of a computer system suitable for rendering a three dimensional image using methods for surface normal compression and decompression according to a preferred embodiment of the invention.

FIG. 11 is a schematic drawing of a computer system 1100 for rendering three dimensional figures, as for example the three dimensional FIG. 101 of FIG. 1, into a three dimensional image 1103 using the methods of surface normal compression and decompression described herein. Computer system 1100 comprises the following hardware: a computer CPU 1155, a computer memory 1160, and a display device which in this figure is represented both as a computer monitor 1170 and as a printer 1175. A surface normal data compression computer program 500 loaded in the computer system 1100 obtains input data containing the surface normals 120 for the three dimensional FIG. 101 either internally from the computer memory 1160, which may be for example hard magnetic disk, floppy disk, or computer active memory, an external data source 1185, which may be for example a computer operator, a communications network, another computer system, or other means. As shown above, the surface normal data compression computer program 500 compresses surface normals 120 and stores those values. A surface normal data decompression computer program 900 decompresses compressed representation of the surface normal 120 for use in the rendering of the three dimensional FIG. 101 into the three dimensional image 1103 on the computer monitor 1170, the printer 1175, or another display device.

Representative embodiments provide methods to compress or map the surface normal 120 in Cartesian, spherical, or any other coordinate system into the compressed representation of the surface normal 120 for the small surface area 110 through which it passes. Other embodiments also provide methods to map from the compressed representation of the surface normal 120 back to the decompressed unit length surface normal 130. The decompressed unit length surface normal 130 is needed at the time the three dimensional FIG. 101 is rendered as the three dimensional image 1103 on the display device, either the computer monitor 1170, the printer 1175, or some other device, of the computer system 1100.

8. Closing Discussion

In addition to implementation as a software program or procedure, compression and decompression techniques of the present invention could be implemented in hardware, as for example in a graphics accelerator chip. In such embodiments, surface normal data could be transferred to the hardware implementation from an application or driver program or from additional upstream hardware in the graphics process flow.

A primary advantage of the invention over prior techniques is the compression of surface normal data without significant loss of visual fidelity. Compressed normals allow graphics applications to display larger geometry data sets with high performance. The inventive methods are simple and fast. They can be implemented in graphics hardware with minimal cost and complexity, and they can be implemented with full graphics performance.

An additional advantage is the increased precision obtained by supporting larger numbers of surface normals. This precision can be provided because the number of surface normals is not constrained to a lookup table with its system limited size. Since lookup tables are not used, this method also provides greater memory efficiency.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A method of compressing a surface normal for use in computer graphics operations, said method comprising the steps of:

representing said surface normal as a unit-length Cartesian vector, said unit-length Cartesian vector having first, second, and third orthogonal vector components, wherein each of said first, second, and third orthogonal vector components is parallel with one of the x, y and z axes of a Cartesian coordinate system and wherein the square root of the sum of the squares of the magnitudes of said first, second, and third orthogonal vector components is equal to one; and storing a pair selected from said first, second, and third orthogonal vector components, wherein the pair of orthogonal vector components form a compressed representation of said unit-length Cartesian vector.

2. The method of claim 1, wherein said pair is chosen from the group consisting of the xy pair, the yz pair and the xz pair.

3. The method of claim 1, further comprising the step of:

storing a direction indicator that specifies the algebraic sign of the one of said first, second, and third orthogonal vector components that is not included within said pair.

4. The method of claim 1, further comprising the steps of:

determining a smallest two vector components, said smallest two vector components corresponding to the two of said first, second, and third orthogonal vector components having the smallest absolute magnitude values, wherein said pair corresponds to said smallest two vector components and wherein said pair is stored according to a predetermined order;

determining a largest vector component, said largest vector component corresponding to the one of said first, second, and third orthogonal vector components having the largest absolute magnitude value; and storing an axis indicator that specifies to which axis of said Cartesian coordinate system said largest vector component is parallel.

5. The method of claim 4, further comprising the step of:

storing a direction indicator that specifies the algebraic sign of said largest vector component.

6. The method of claim 1, further comprising the step of:

storing a direction indicator that specifies the octant of said Cartesian coordinate system in which said surface normal points.

7. A method for obtaining a decompressed surface normal from a compressed surface normal for use in computer graphics operations, said method comprising the steps of:

retrieving first and second stored orthogonal vector component values, said first and second stored orthogonal vector component values corresponding to said compressed surface normal;

determining a sum, said sum equal to the sum of the squares of said first and second stored orthogonal vector component values;

determining a difference, said difference equal to said sum subtracted from 1;

determining a square root, said square root equal to the square root of said difference; and setting the magnitude of a third orthogonal vector component value equal to said square root.

8. The method of claim 7, wherein said first and second stored orthogonal vector component values correspond to two of the three Cartesian vector components of said decompressed surface normal.

9. The method of claim 7, further comprising the steps of:

retrieving a stored direction indicator; and setting the algebraic sign of said third orthogonal vector component value responsive to said stored direction indicator.

10. The method of claim 7, further comprising the steps of:

retrieving a stored axis indicator;

responsive to said stored axis indicator, associating said third orthogonal vector component value to one of the x, y, and z axes of a Cartesian coordinate system.

11. The method of claim 10, further comprising the steps of:

retrieving a stored direction indicator; and setting the algebraic sign of said third orthogonal vector component value responsive to said stored direction indicator.

12. The method of claim 7, further comprising the steps of:

retrieving a stored direction indicator; and responsive to said stored direction indicator, associating said decompressed surface normal with one of the octants of a Cartesian coordinate system.

13. A computer program storage medium readable by a computer, tangibly embodying a computer program of instructions executable by the computer to perform method steps for compressing a surface normal for use in computer graphics operations, said method steps comprising:

representing said surface normal as a unit-length Cartesian vector, said unit-length Cartesian vector having first, second, and third orthogonal vector components, wherein each of said first, second, and third orthogonal vector components is parallel with one of the x, y and z axes of a Cartesian coordinate system and wherein the square root of the sum of the squares of the magnitudes of said first, second, and third orthogonal vector components is equal to one; and storing a pair selected from said first, second, and third orthogonal vector components, wherein the pair of orthogonal vector components form a compressed representation of said unit-length Cartesian vector.

14. The computer program storage medium of claim 13, wherein said pair is chosen from the group consisting of the xy pair, the yz pair and the xz pair.

15. The computer program storage medium of claim 13, wherein the instructions of the computer program further comprise the step of:
    storing a direction indicator that specifies the algebraic sign of the one of said first, second, and third orthogonal vector components that is not included within said pair.

16. The computer program storage medium of claim 13, wherein the instructions of the computer program further comprise the steps of:
    determining a smallest two vector components, said smallest two vector components corresponding to the two of said first, second, and third orthogonal vector components having the smallest absolute magnitude values, wherein said pair corresponds to said smallest two vector components and wherein said pair is stored according to a predetermined order;
    determining a largest vector component, said largest vector component corresponding to the one of said first, second, and third orthogonal vector components having the largest absolute magnitude value; and
    storing an axis indicator that specifies to which axis of said Cartesian coordinate system said largest vector component is parallel.

17. The computer program storage medium of claim 16, wherein the instructions of the computer program further comprise the step of:
    storing a direction indicator that specifies the algebraic sign of said largest vector component.

18. The computer program storage medium of claim 13, wherein the instructions of the computer program further comprise the step of:
    storing a direction indicator that specifies the octant of said Cartesian coordinate system in which said surface normal points.

19. A computer program storage medium readable by a computer, tangibly embodying a computer program of instructions executable by the computer to perform method steps for obtaining a decompressed surface normal from a compressed surface normal for use in computer graphics operations, said method steps comprising:
    retrieving first and second stored orthogonal vector component values, said first and second stored orthogonal vector component values corresponding to said compressed surface normal;
    determining a sum, said sum equal to the sum of the squares of said first and second stored orthogonal vector component values;
    determining a difference, said difference equal to said sum subtracted from 1;
    determining a square root, said square root equal to the square root of said difference; and
    setting the magnitude of a third orthogonal vector component value equal to said square root.

20. The computer program storage medium of claim 19, wherein said first and second stored orthogonal vector component values correspond to two of the three Cartesian vector components of said decompressed surface normal.

21. The computer program storage medium of claim 19, wherein the instructions of the computer program further comprise the steps of:
    retrieving a stored direction indicator; and
    setting the algebraic sign of said third orthogonal vector component value responsive to said stored direction indicator.

22. The computer program storage medium of claim 19, wherein the instructions of the computer program further comprise the steps of:
    retrieving a stored axis indicator;
    responsive to said stored axis indicator, associating said third orthogonal vector component value to one of the x, y, and z axes of a Cartesian coordinate system.

23. The computer program storage medium of claim 22, wherein the instructions of the computer program further comprise the steps of:
    retrieving a stored direction indicator; and
    setting the algebraic sign of said third orthogonal vector component value responsive to said stored direction indicator.

24. The computer program storage medium of claim 19, wherein the instructions of the computer program further comprise the steps of:
    retrieving a stored direction indicator; and
    responsive to said stored direction indicator, associating said decompressed surface normal with one of the octants of a Cartesian coordinate system.

25. A computer system configured for use in computer graphics operations, comprising:
    a memory containing:
        a computer program having functions for compressing a surface normal, said functions comprising:
            representing said surface normal as a unit-length Cartesian vector, said unit-length Cartesian vector having first, second, and third orthogonal vector components, wherein each of said first, second, and third orthogonal vector components is parallel with one of the x, y and z axes of a Cartesian coordinate system and wherein the square root of the sum of the squares of the magnitudes of said first, second, and third orthogonal vector components is equal to one; and
            storing a pair selected from said first, second, and third components, wherein the pair of orthogonal vector components form a compressed representation of said unit-length Cartesian vector; and
    a processor for running the computer program.

26. The computer system of claim 25, wherein the functions of the computer program choose said pair from the group consisting of the xy pair, the yz pair and the xz pair.

27. The computer system of claim 25, wherein the functions of the computer program further comprise:
    storing a direction indicator that specifies the algebraic sign of the one of said first, second, and third orthogonal vector components that is not included within said pair.

28. The computer system of claim 25, wherein the functions of the computer program further comprise:
    determining a smallest two vector components, said smallest two vector components corresponding to the two of said first, second, and third orthogonal vector components having the smallest absolute magnitude values, wherein said pair corresponds to said smallest two vector components and wherein said pair is stored according to a predetermined order;

determining a largest vector component, said largest vector component corresponding to the one of said first, second, and third orthogonal vector components having the largest absolute magnitude value; and storing an axis indicator that specifies to which axis of said Cartesian coordinate system said largest vector component is parallel.

29. The computer system of claim 28, wherein the functions of the computer program further comprise:

storing a direction indicator that specifies the algebraic sign of said largest vector component.

30. The computer system of claim 25, wherein the functions of the computer program further comprise:

storing a direction indicator that specifies the octant of said Cartesian coordinate system in which said surface normal points.

31. A computer system configured for use in computer graphics operations, comprising:

a memory containing:
  a computer program having functions for obtaining a decompressed surface normal from a compressed surface normal; said functions comprising:
    retrieving first and second stored orthogonal vector component values, said first and second stored orthogonal vector component values corresponding to said compressed surface normal;
    determining a sum, said sum equal to the sum of the squares of said first and second stored orthogonal vector component values;
    determining a difference, said difference equal to said sum subtracted from 1;
    determining a square root, said square root equal to the square root of said difference; and
    setting the magnitude of a third orthogonal vector component value equal to said square root; and
a processor for running the computer program.

32. The computer system of claim 31, wherein said first and second stored orthogonal vector component values in the functions of the computer program correspond to two of the three Cartesian vector components of said decompressed surface normal.

33. The computer system of claim 31, wherein the functions of the computer program further comprise:

retrieving a stored direction indicator; and setting the algebraic sign of said third orthogonal vector component value responsive to said stored direction indicator.

34. The computer system of claim 31, wherein the functions of the computer program further comprise:

retrieving a stored axis indicator;

responsive to said stored axis indicator, associating said third orthogonal vector component value to one of the x, y, and z axes of a Cartesian coordinate system.

35. The computer system of claim 34, wherein the functions of the computer program further comprise:

retrieving a stored direction indicator; and setting the algebraic sign of said third orthogonal vector component value responsive to said stored direction indicator.

36. The computer system of claim 31, wherein the functions of the computer program further comprise:

retrieving a stored direction indicator; and responsive to said stored direction indicator, associating said decompressed surface normal with one of the octants of a Cartesian coordinate system.

37. A computer program storage medium readable by a computer, tangibly embodying a computer program of instructions executable by the computer to perform method steps for compressing a surface normal into a compressed surface normal and for obtaining a decompressed surface normal from the compressed surface normal for use in computer graphics operations, said method steps comprising:

representing said surface normal as a unit-length Cartesian vector, said unit-length Cartesian vector having first, second, and third orthogonal vector components, wherein each of said first, second, and third orthogonal vector components is parallel with one of the x, y and z axes of a Cartesian coordinate system and wherein the square root of the sum of the squares of the magnitudes of said first, second, and third orthogonal vector components is equal to one;

storing a pair selected from said first, second, and third orthogonal vector components, wherein the pair of orthogonal vector components form a compressed representation of said unit-length Cartesian vector;

retrieving first and second stored orthogonal vector component values, said first and second stored orthogonal vector component values corresponding to said compressed surface normal;

determining a sum, said sum equal to the sum of the squares of said first and second stored orthogonal vector component values;

determining a difference, said difference equal to said sum subtracted from 1;

determining a square root, said square root equal to the square root of said difference; and setting the magnitude of a third orthogonal vector component value equal to said square root.

38. The computer program storage medium of claim 37, wherein said pair is chosen from the group consisting of the xy pair, the yz pair and the xz pair.

39. The computer program storage medium of claim 37, wherein the instructions of the computer program further comprise the step of:

storing a direction indicator that specifies the algebraic sign of the one of said first, second, and third orthogonal vector components that is not included within said pair.

40. The computer program storage medium of claim 37, wherein the instructions of the computer program further comprise the steps of:

determining a smallest two vector components, said smallest two vector components corresponding to the two of said first, second, and third orthogonal vector components having the smallest absolute magnitude values, wherein said pair corresponds to said smallest two vector components and wherein said pair is stored according to a predetermined order;

determining a largest vector component, said largest vector component corresponding to the one of said first, second, and third orthogonal vector components having the largest absolute magnitude value; and storing an axis indicator that specifies to which axis of said Cartesian coordinate system said largest vector component is parallel.

41. The computer program storage medium of claim 40, wherein the instructions of the computer program further comprise the step of:

storing a direction indicator that specifies the algebraic sign of said largest vector component.

42. The computer program storage medium of claim 37, wherein the instructions of the computer program further comprise the step of:

storing a direction indicator that specifies the octant of said Cartesian coordinate system in which said surface normal points.

43. The computer program storage medium of claim 37, wherein said first and second stored orthogonal vector component values correspond to two of the three Cartesian vector components of said decompressed surface normal.

44. The computer program storage medium of claim 37, wherein the instructions of the computer program further comprise the steps of:

retrieving a stored direction indicator; and setting the algebraic sign of said third orthogonal vector component value responsive to said stored direction indicator.

45. The computer program storage medium of claim 37, wherein the instructions of the computer program further comprise the steps of:

retrieving a stored axis indicator;

responsive to said stored axis indicator, associating said third orthogonal vector component value to one of the x, y, and z axes of a Cartesian coordinate system.

46. The computer program storage medium of claim 45, wherein the instructions of the computer program further comprise the steps of:

retrieving a stored direction indicator; and setting the algebraic sign of said third orthogonal vector component value responsive to said stored direction indicator.

47. The computer program storage medium of claim 37, wherein the instructions of the computer program further comprise the steps of:

retrieving a stored direction indicator; and responsive to said stored direction indicator, associating said decompressed surface normal with one of the octants of a Cartesian coordinate system.

\* \* \* \* \*